2 Sheets—Sheet 1.
N. SWAGER.
SULKY OR RIDING PLOW.
No. 11,361. Reissued Aug. 15, 1893.
Fig. 1.
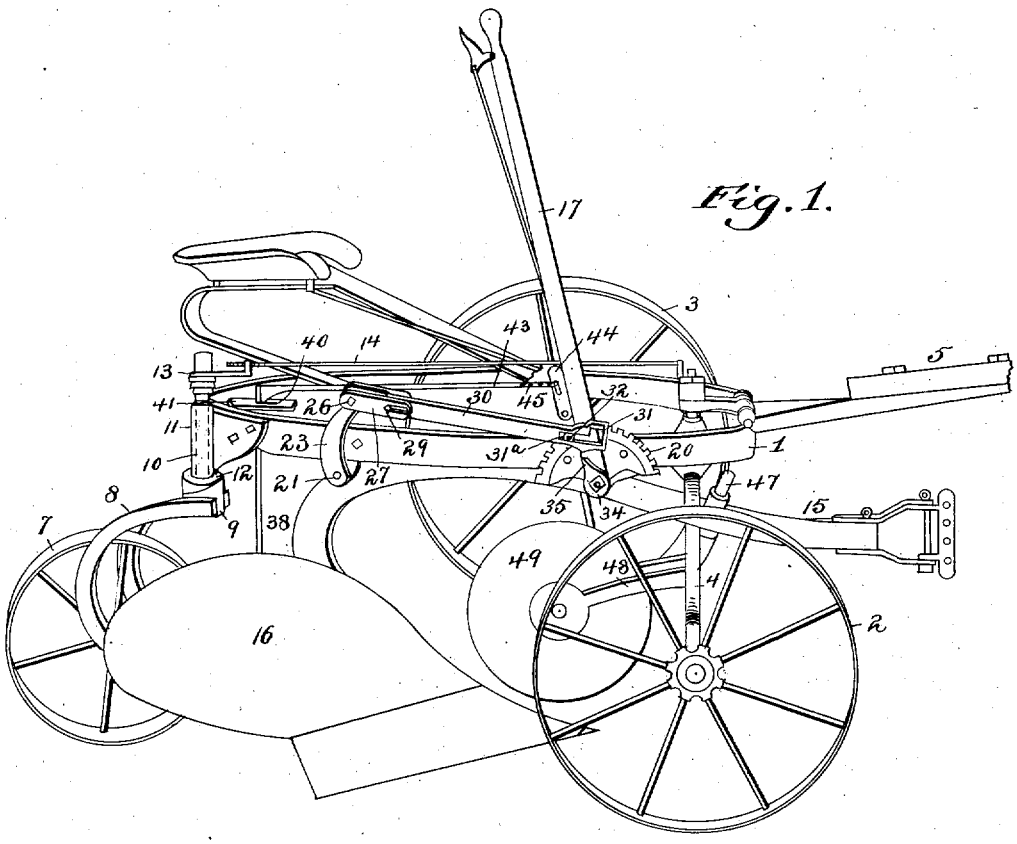
Fig. 8
Fig. 3.
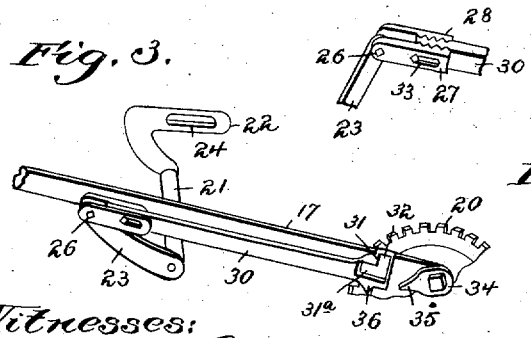
Fig. 4.
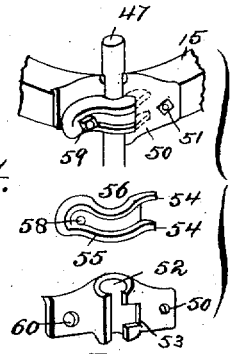
Witnesses:
J. B. McGirr.
Frank L. Dyer
Inventor:
Nelson Swager
by Monroe M. Cady,
Attorney 2 Sheets—Sheet 2.

N. SWAGER.

SULKY OR RIDING PLOW.

No. 11,361. Reissued Aug. 15, 1893.

Witnesses:

J. S. McGirr.

Frank L. Ayer.

Inventor:

Nelson Swager.

by Monroe M. Cady.

Attorney

UNITED STATES PATENT OFFICE.

NELSON SWAGER, OF DUBUQUE, IOWA, ASSIGNOR TO THE NORWEGIAN PLOW COMPANY, OF SAME PLACE.

SULKY OR RIDING PLOW.

SPECIFICATION forming part of Reissued Letters Patent No. 11,361, dated August 15, 1893.

Original No. 466,284, dated December 29, 1891. Application for reissue filed June 26, 1893. Serial No. 478,899.

*To all whom it may concern:*

Be it known that I, NELSON SWAGER, a citizen of the United States, residing at Dubuque, in the county of Dubuque and State of Iowa, have invented certain new and useful Improvements in Sulky or Riding Plows; and I do hereby declare the following to be a full, clear, and exact description of the invention, such as will enable others skilled in the art to which it appertains to make and use the same.

My invention has relation to sulky or riding plows, and more particularly to the devices whereby the plow may be lowered into and raised out of the ground when desired; to the devices for clutching the colter, and to the devices for raising and lowering the rear portion of the plow frame with respect to the rear caster-wheel; and among the objects sought to be attained are to provide simply and easily operated devices, whereby either the toe or the heel of the plow or both may be lowered into and raised from the ground when desired; to provide a simple device for securing detachably the colter in position; to provide a device whereby the heel of the plow and the rear portion of the plow-frame may be raised or lowered with respect to the rear caster-wheel, when the plow is turning a corner, to insure the point of said plow being held firmly in the ground; in lifting the plow, to raise the point first and the heel afterward, and in lowering, to lower the point first and the heel afterward; and further, to raise the entire plow, when not in use, to a position of unusual height, and then, in lowering, to hold the heel in a high position until the point is at or near the ground, and then release the heel and permit it to descend by its own weight at such a sharp angle and in such a position that the weight of the plow will aid in forcing it quickly into the ground.

With the above and other objects in view, the invention consists in the construction, arrangement and combination of parts, as hereinafter fully described, illustrated in the accompanying drawings, and pointed out in the appended clauses of claim.

Figure 2:
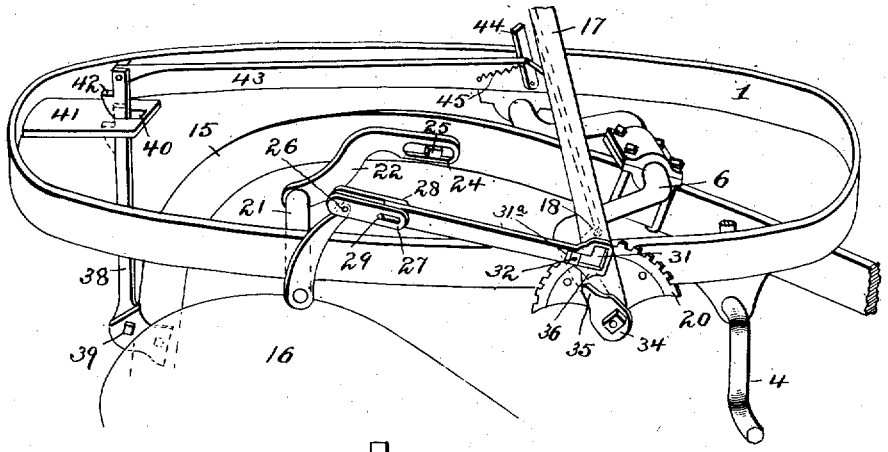
Figure 7:
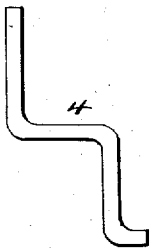
Figure 6:
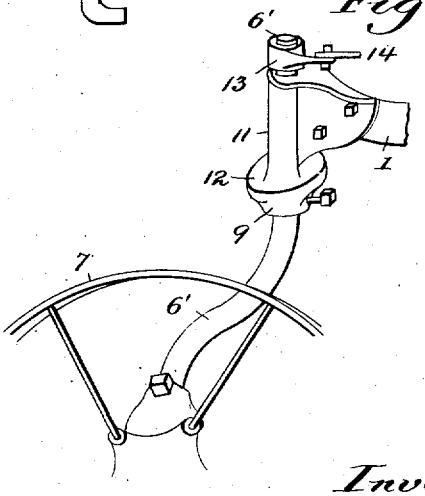
Figure 5:
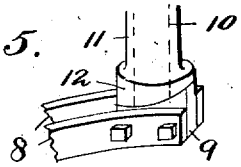

In the drawings, Figure 1, is a perspective view of a sulky or riding plow embodying my improvements. Fig. 2, is a like view of Fig. 1, on a slightly enlarged scale, with parts removed for the sake of clearness. Fig. 3, is a detail, perspective view of a portion of the raising and lowering device and also of the device for holding the heel in a given high position until the point has descended to or near the ground. Fig. 4, is a detail, perspective view of the means for securing the colter in position. Fig. 5, is a like view of the means for raising the heel of the plow and rear end of the plow-frame, with respect to the rear caster-wheel. Fig. 6, is a detail, perspective view illustrating a modification in the means for raising the heel of the plow and rear end of the plow-frame, with respect to the rear caster-wheel. Fig. 7, is a detail view of the axle upon which one of the forward wheels is mounted, and, Fig. 8, is a like view hereinafter referred to.

1, indicates the plow-frame, which may be of any suitable construction, that shown having substantially a rectangular shape and supported at its forward end by the wheels, 2, 3. The former is mounted upon an axle 4, having substantially the shape shown in Fig. 7, said axle passing through a bearing on the frame and upwardly and having secured thereto one end of the tongue 5. The wheel 3, is mounted upon one end of a crank shaft or axle 6, having bearings upon the plow frame.

As shown in Fig. 1, the rear end of the plow-frame is supported by means of a caster-wheel 7, mounted between the arms 8, which latter are provided intermediate their upper ends with a bearing block 9, having an upper curved or segmental bearing surface. The block 9, is provided with an upwardly extending spindle 10, which passes through a sleeve, 11, secured to the plow-frame, said sleeve having an enlargement, 12, whose under surface is curved and bears upon the curved surface of the block 9. The upper end of the spindle 10 is adapted to be turned by means of the crank-arm 13, and rod 14, in the usual manner. Thus a cam device is formed by means of the block 9, and enlargement 12, so that when the spindle is turned the plow-frame will be raised with respect to the caster-wheel as will also the heel of the plow a trifle, as will be presently seen, thus causing the point of the plow to be held more firmly in the ground, which is desirable when turning corners.

In Fig. 6, I have shown a slightly different mode of connecting the caster-wheel with the plow-frame. In said figure the caster-wheel is mounted on one end of a curved axle 6′, which carries near its upper end the cam-block 9, against whose upper cam-face bears the enlargement 12, whose lower surface is curved, as before described. The axle passes upwardly through the sleeve 11, (similarly to the spindle 10,) and to the upper end of the axle is connected one end of the rod 14. Thus, by turning the axle 6′, I obtain a result similar to that obtained by the arrangement shown in Fig. 1.

15, indicates the plow-beam to which is secured the plow 16. The forward portion of the beam is supported by the crank-axle 6, to which it is clamped by any suitable means, as shown. One end of said axle passes through the plow-frame, and has secured to its projecting end an operating-lever 17, provided with the usual spring actuated dog 18, said dog engaging the teeth of a sector-shaped plate 20, secured to the side of the plow-frame. By moving the lever backwardly and forwardly it will be seen that the forward portion of the plow-beam will be caused to be raised or lowered with respect to the plow-frame, and thus raise or lower the point of the plow 16, out of or into the ground first.

21, indicates a shaft, having a bearing in the plow-frame in rear of the shaft 6, said shaft 21, being provided with crank-arms 22, 23, the former of which is provided with a slot 24, to receive a stud 25, projecting from the plow beam. The upper end of the arm 23 is pivotally mounted upon a bolt 26, connecting plates 27 and 28, which are secured by means of a bolt 29 to one end of a rod 30, whose other end is provided with an angular slot 31, 31ª, as shown. Through said slot projects a bolt or stud 32, carried by the lever 17, said bolt, when the parts are in the position represented in Fig. 1, with the plow lowered to the horizontal plane of the bottom of the furrow-wheels, will be in 31ª, a short distance forward of the rear of said slot. The lever 17, being connected to one end of the crank axle 6, when it is turned backwardly will raise the front end of the plow-beam and at the same time slightly crowd backwardly and upwardly the rear of the beam, at the point of contact with the arm 22 till the front of the beam strikes against the front end of the frame, when a continued backward moving of the lever 17, will raise the rear of the plow-beam upward and backward, the upper part of the front of the plow beam bearing pivotally against the under side of the front of the frame; this action of the rear of the beam, having the stud 25 in the slot 24, will push the stud 25 against the upper portion of the crank arm 22, and gradually push backwardly and upwardly the crank 22, and turn the shaft 21, which will turn back the crank-arm 23, and pull back the rod 30, till the front end of said rod 30 has been drawn beyond the contact with the stud 32 in the slot 31ª, and dropped by its own gravity down on the stud 32 in 31, leaving said stud in slot 31, at which time the plow will be in its highest position. Thus it will be seen that the crank arm 22 and its connections, with the rod 30, are operated entirely by the rear of the plow beam. The plates 27, 28 are toothed or serrated on their opposing inner faces, and the end of the rod 30 is likewise toothed or serrated, so that when the bolt 29 is tightened the rod will be firmly secured or held between the plates with no liability of becoming loosened. The plates and the end of the rod 30 may be slotted as shown at 33, to permit of the adjustment of the parts, and thus control the height, at which the heel shall be held, while the point is descending to or near the ground.

The means for sustaining, and also for locking and maintaining the heel in its lowered position, consists of a rod 38, pivotally secured at its lower end to the plow beam, as at 39, and extending upwardly through the slot 40 in the plate 41, secured to the plow frame. Near its upper end the rod 38 is provided with a shoulder 42, which, when the plow is in its lowered position, will prevent the heel of the plow from jumping upward while plowing. At the upper end of the rod 38, is pivotally attached a connecting rod 43, the rear end of the rod 43 resting on the top of the plate 41, the rod 38 being suspended on said pivot so that there shall be no weight of the heel of the plow on the ground. The rod 43 extends forward to the foot lever 44, pivoted to the frame, and adapted to be operated by the foot of the driver. A spring 45 secured at one end to the plow frame and at the other to the rod 43 serves to automatically retract the latter when the same is pushed forwardly by the foot pressing against the lever 44. It will be observed that the rod 43 may be made to act entirely automatically in operating the top of the rod 38. It will also be seen that when it is desired to disengage the shoulder of the rod 38 from the plate 41, to permit of the heel of the plow being raised to its highest position, by means of the devices hereinbefore mentioned, the driver presses forwardly upon the lever 44, thus drawing forward the rod 43 and freeing the shoulder 42.

Rigidly secured to the shaft 6, adjacent to the lever 17, is a trip 34, having a nose 35, said trip occupying a position on the shaft at a slight angle to the lever 17 as shown. The rod 30, at the end adjacent to lever 17, is provided with a nose or projection 36, which, when the parts are in the position represented in Figs. 1, 2, and 3, is disengaged from the nose 35. Assuming the lever 17 to have been pushed rearwardly into the position shown in Fig. 3, with the plow at its highest position above the ground, if it now be desired to lower the plow point, the lever 17 is gradually pushed forward, allowing the point of the plow to descend toward the ground. As soon as the lever begins to move forward, the front end of the rod 30 approaches toward and impinges against the stud 32, while it is in the slot 31, and thus prevents the heel of the plow from being lowered but slightly if any. As the lever is pushed forward, until the point of the plow comes to or near the ground, the nose 35 will impinge against the nose 36 and raise the front of the rod 30 until the slot 31[a] engages with the stud 32, which releases instantly the heel of the plow and permits it to descend to the ground by its own gravity forcing the plow into the ground. The rod 38 will be drawn down by the heel of the plow until the end of the rod 43 rests upon the plate 41, and the shoulder 42 is forced through the slot 40 and locked in position beneath the plate 41 by the spring 45. It will be readily seen that various means may be employed for causing the arm 22 to hold up the heel of the plow while the point is being lowered.

For the purpose of readily securing the colter 49 to and disconnecting the same from the plow beam, I employ the following means: 47 indicates the stem or rod which at its lower end is secured to the arms 48 carrying the colter 49. 50 indicates a plate secured to one side of the plow beam by means of bolt 51. This plate is provided with a semi or nearly cylindrical socket 52 to receive the stem 47, and is cut away, as at 53, to permit the ears or tongues 54, formed on a second plate 55, to be passed through said cutaway portion and engage behind the plate 50, as seen in dotted lines in Fig. 4. The plate 55 is also provided with a semi-cylindrical socket 56, which in conjunction with the socket 52, forms a cylindrical bearing for the stem 47. The plate 55 has a perforation 58 to permit of a bolt 59 being passed therethrough, and through a perforation 60 in plate 50 and into the plow beam, thus firmly securing the plate 55 into position and at the same time adapted to permit said plate being readily loosened or disconnected, to allow the stem 47 to be withdrawn or adjusted.

The advantages derived from my various improvements will be apparent from the foregoing description, taken in connection with the accompanying drawings and although I have herein described and illustrated the preferred form and construction of my invention, it will be understood that various changes or modifications might be made in the same without departing from the spirit thereof.

What I claim as new, and desire to secure by Letters Patent, is—

1. In a sulky plow, the combination of a sustaining frame supported on carrying wheels, a plow beam supported near its forward end upon a crank connected with the frame, a lever for operating said crank and a crank-arm mounted upon the frame and loosely connected to the rear of the beam and operated by said beam, whereby, in raising the plow, the point will be first raised and then the heel, and in lowering, the point shall first be lowered and then the heel, as and for the purposes shown.

2. In a sulky plow, the combination with the sustaining frame and carrying wheels, of a crank arm connecting said sustaining frame with the rear of the plow beam, and a rod connected with said crank arm, adapted to engage and be sustained by a stud or pin, for holding the heel of the plow up until the point is lowered to or near the ground and means for releasing said rod from such engagement with said stud or pin and to allow the heel of the plow to descend by its own gravity, after the point has been lowered to or near the ground, as and for the purpose shown.

3. The combination, with the plow-frame and the supporting-wheels therefor, of a crank-shaft supported by said frame, an operating-lever mounted upon one end of said crank-shaft, a plow-beam secured to the crank-shaft, a second crank-shaft supported by the plow-frame and having crank-arms, one of which is secured to the plow-beam and operated thereby, and a connecting-rod secured at one end to the other crank-arm and its other end loosely suspended upon a stud on the operating-lever, but not operated thereby, all arranged for co-operation, substantially as described.

4. The combination, with the plow-frame and the supporting-wheels thereof, of a crank-shaft supported by said frame, an operating-lever upon one end of said shaft, a plow-beam secured to the crank-shaft, a second crank-shaft supported by the plow-frame and having crank-arms, one of which is secured to the plow-beam and operated thereby, a rod connected at one end to the other crank-arm and at its other end loosely suspended upon a stud on the operating-lever, but not operated by it, and a tripping device carried by the first mentioned crank-shaft and adapted to release the said rod and permit the heel of the plow to descend by its own gravity when the operating-lever is pushed so far forwardly as to lower the point of the plow to the ground, all arranged for co-operation, substantially as described.

5. In a sulky plow, the combination of a frame supported on carrying-wheels, a crank connected with the frame, an operating-lever attached to the crank, a plow-beam, with plow attached thereto, supported near its forward end upon the crank connected with the frame, and its rear end loosely suspended from the rear of the frame, whereby the point of the plow may be raised and the heel held down, as and for the purposes shown and described.

6. In a sulky plow, the combination of a frame, mounted on carrying-wheels, a crank connected to said frame and a lever attached to the crank for operating the same, a plow-beam with a plow attached thereto, supported near its forward end to the crank and its rear end loosely suspended by a rod from the rear of the frame, and means for locking and unlocking said rod, whereby the heel of the plow is held down in plowing and released when raised, as and for the purposes shown.

7. The combination, with the plow-frame and the supporting-wheels therefor, of a crank-shaft supported by the plow-frame, an operating-lever mounted upon one end of said crank-shaft, a plow-beam secured to the crank-shaft, a second crank-shaft supported by the plow-frame and having crank-arms, one of which is secured to the plow-beam and operated thereby, a rod secured at one end to the other crank-arm and at its opposite end loosely suspended upon a stud on the operating-lever for the purpose of holding up the heel till the point is lowered; a locking device carried by the said beam and adapted to lock the latter when the rear portion thereof is in its lowered position, and means for disengaging the locking device to permit of the rear portion of the beam being raised, substantially as described.

8. In a sulky plow, the combination with a plow-frame mounted on carrying-wheels, of a crank mounted in the frame, a lever for operating said crank, a plow-beam supported by said crank and raised and lowered thereby, a second crank mounted on the frame, and operated by the beam, a rod connected at one end to said second crank and operated thereby, and at the other end loosely attached to a stud and provided with a shoulder, which by the movement of the plow-beam, shall be brought to bear against said stud and hold the heel of the plow in the air, while the point is being lowered, and a trip arranged to release the shoulder from the stud, as and for the purposes shown.

9. In a sulky plow, the combination with a plow-frame mounted on carrying-wheels, of a plow-beam pivotally attached to and locked at its rear to the rear of the plow-frame by a rod, with means for unlocking the same, a portion of the plow-frame carried around at a given height over the front of the beam, whereby the beam shall come in contact with same during a portion of its upward movement, a crank operated by a lever mounted on the frame and so arranged to raise and lower the beam, that in its upward movement it raises the front of the beam to contact with said frame and then raises the heel, and a crank mounted on the plow-frame loosely connected with the beam and operated thereby, for holding up the heel of the plow while the point is being lowered, substantially as shown and described.

10. The combination, with the plow-frame and the supporting-wheels therefor, of a crank-shaft supported by said frame, an operating-lever upon one end of said shaft, a plow-beam secured to the crank-shaft, a second crank-shaft supported by the plow-frame and having crank-arms, one of which is secured to the plow-beam and operated thereby, a rod secured at one end to the other crank-arm and at the opposite end loosely suspended upon a stud on the operating-levers; a rod secured to the rear portion of the plow-beam and having a shoulder, a slotted plate carried by the plow-frame and through which extends the said rod, a horizontal rod secured at one end to the rod connected to the heel of the plow and at its other end to the foot-lever pivoted to the plow-frame, and a spring for retracting the horizontal rod when the same has been pushed forwardly by the foot-lever, all arranged for co-operation, substantially as described.

11. The herein-described clutch, comprising the plate 50, having a socket 52, a perforation 60, and the cut-away portion 53, and the plate 55, having tongues 54 adapted to enter the cut-away portion 53, a socket 56 and a perforation 58, said socket and perforation being adapted to coincide with the socket and perforation of plate 50.

12. The combination, with the plow-frame, of a caster-wheel mounted between supporting-arms, a spindle pivotally connected to the plow-frame, a sleeve surrounding said spindle, and a cam device carried by the supporting-arms and the sleeve and adapted to raise and lower the plow-frame with respect to the caster-wheel when said spindle is turned, as described.

13. The combination, with the plow-frame, of a caster-wheel mounted between supporting-arms 8, the bearing-block 9, having a curved upper surface, the spindle 10, rising from said block, and the sleeve 11, secured to the plow-frame and provided with an enlargement 12, having its under surface curved and bearing upon the block 9, as and for the purposes specified.

Signed in the presence of two witnesses this 12th day of June, A. D. 1893.

NELSON SWAGER.

Witnesses:
WM. C. VOGT,
OTTO F. SCHILL.